Oct. 21, 1952 W. ERNST 2,614,539
FLUID PRESSURE ACTUATED REVERSING VALVE FOR HYDRAULIC RAMS
Filed Dec. 7, 1946 6 Sheets-Sheet 2

INVENTOR
WALTER ERNST
BY
Toulmin & Toulmin
ATTORNEYS

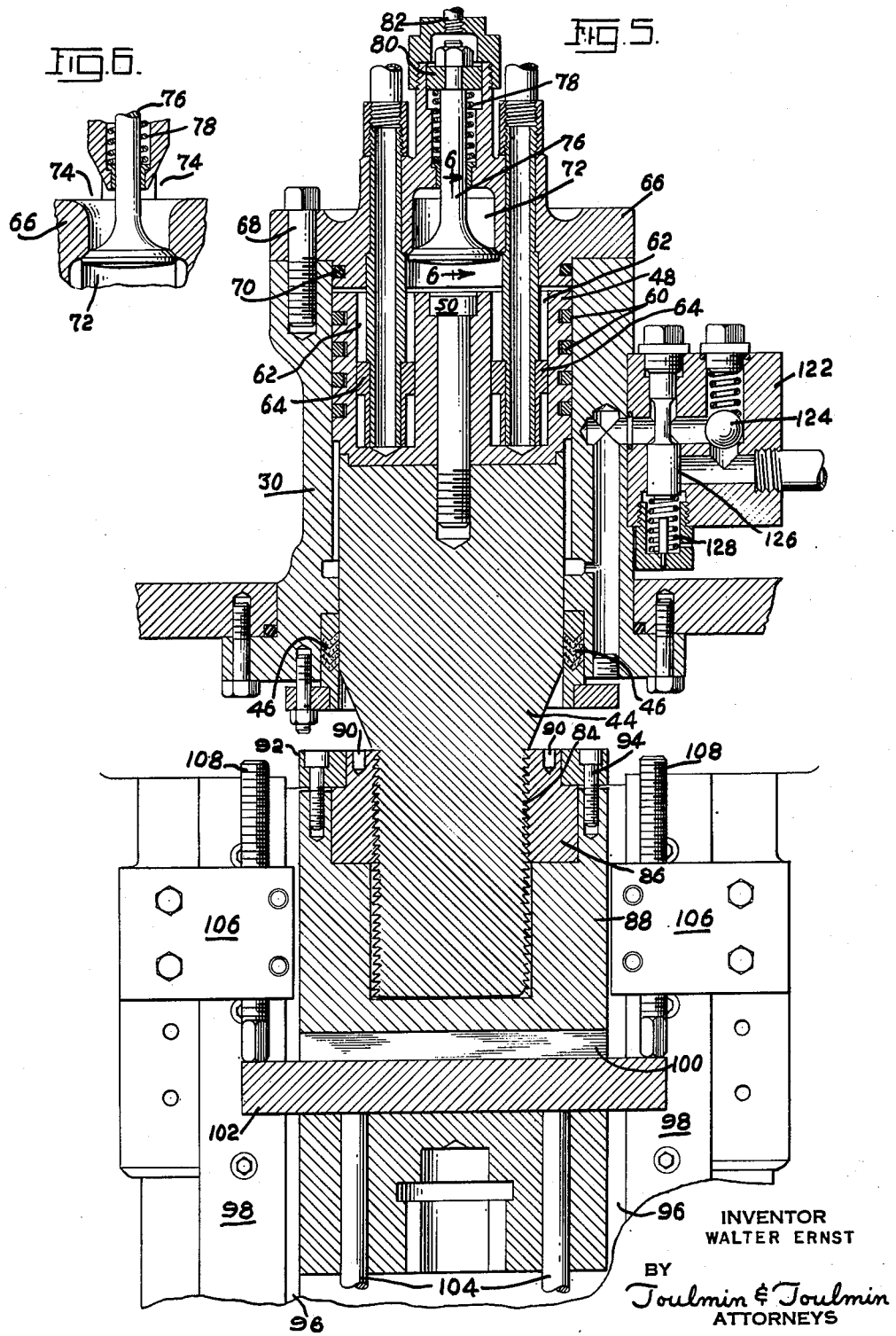

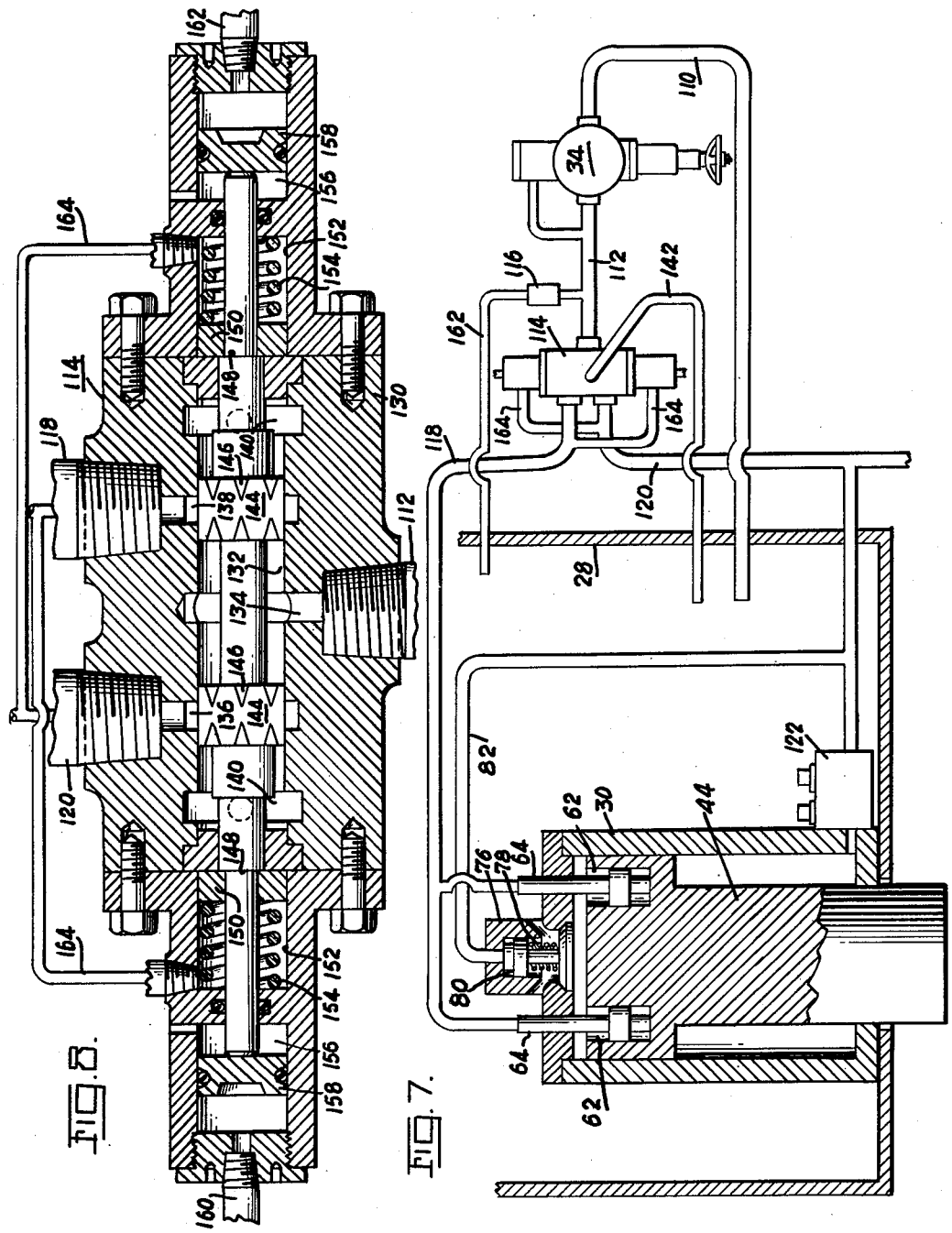

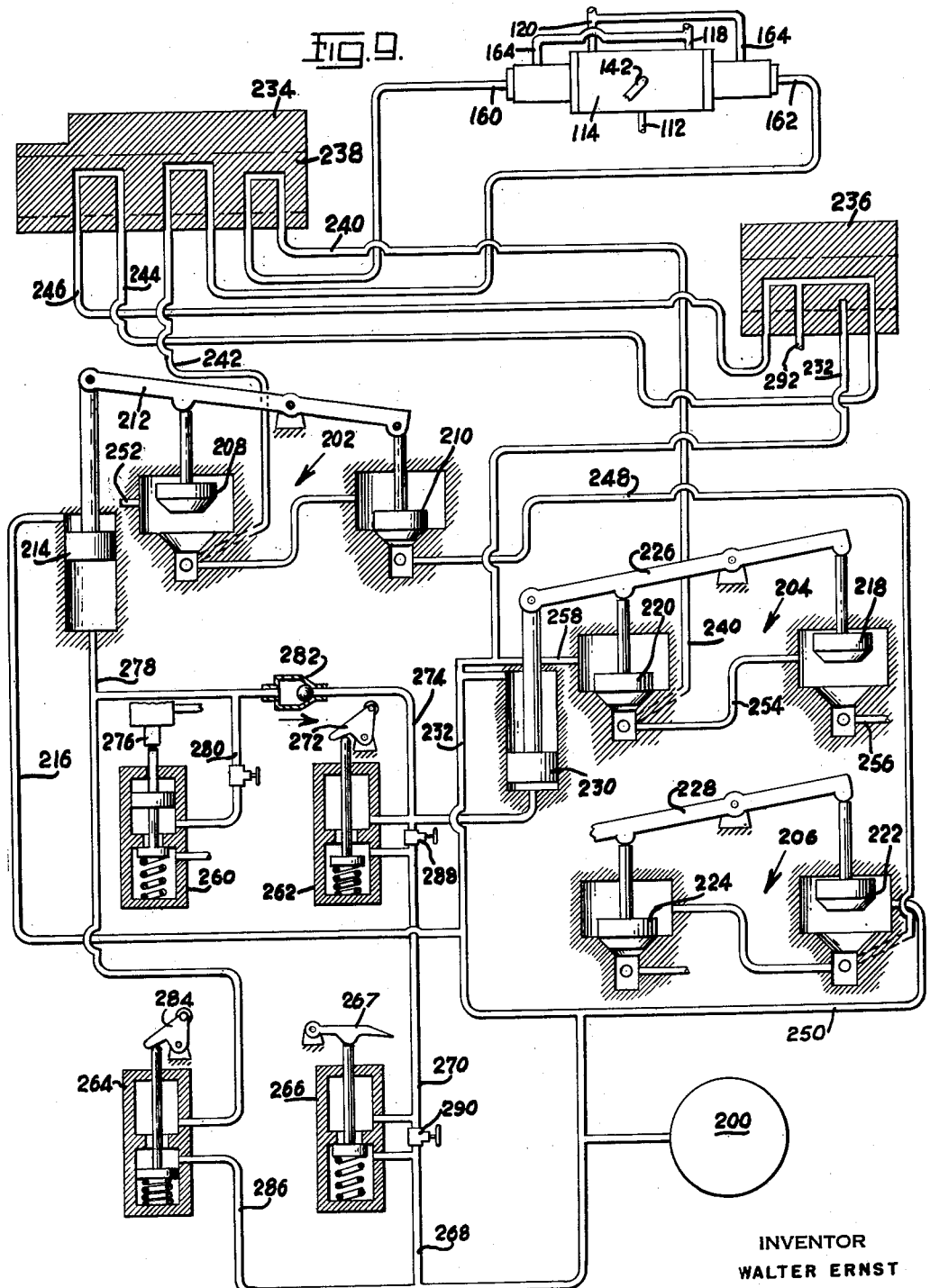

Oct. 21, 1952  W. ERNST  2,614,539
FLUID PRESSURE ACTUATED REVERSING VALVE FOR HYDRAULIC RAMS
Filed Dec. 7, 1946  6 Sheets-Sheet 6
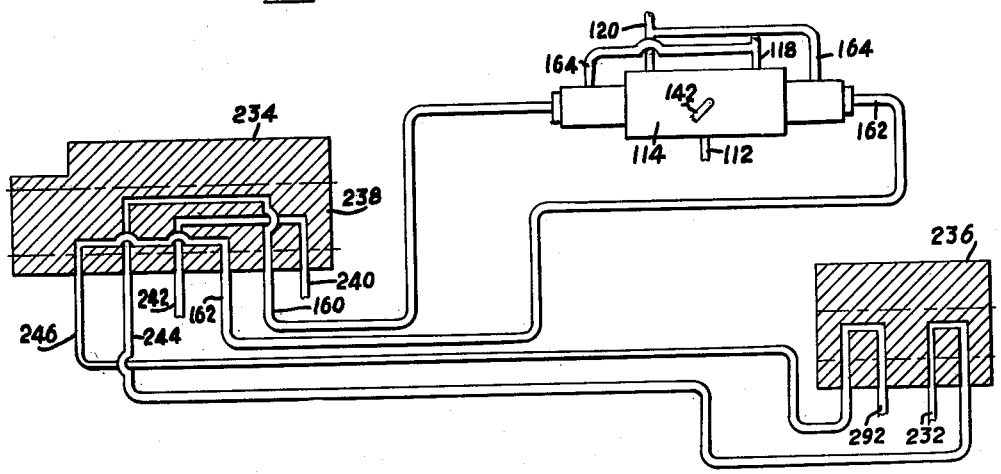
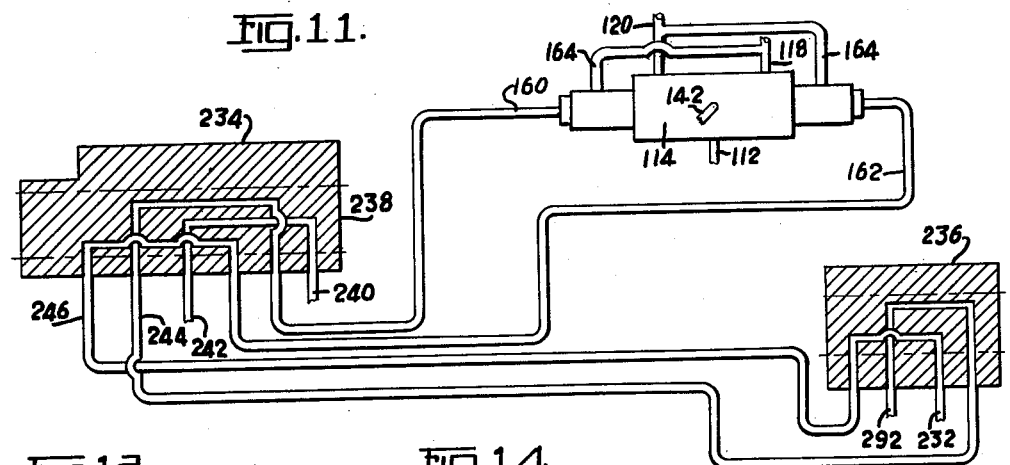
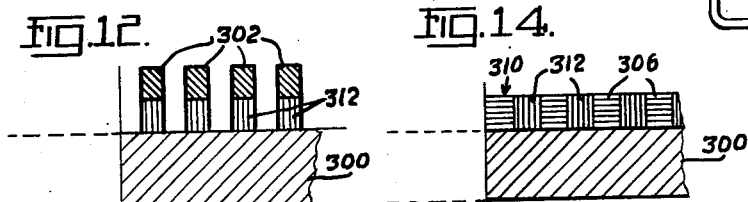
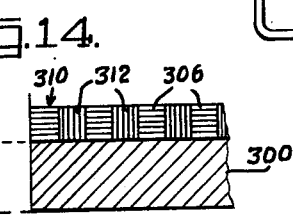
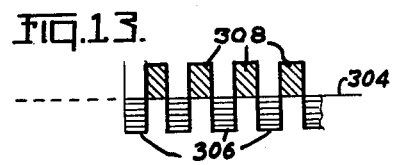
INVENTOR
WALTER ERNST
BY
Toulmin & Toulmin
ATTORNEYS Patented Oct. 21, 1952

2,614,539

UNITED STATES PATENT OFFICE 2,614,539

FLUID PRESSURE ACTUATED REVERSING VALVE FOR HYDRAULIC RAMS

Walter Ernst, Mount Gilead, Ohio, assignor to H-P-M Development Corporation, Wilmington, Del., a corporation of Delaware Application December 7, 1946, Serial No. 714,840

4 Claims. (Cl. 121—46.5)

This invention relates to machine tools and particularly to presses.

The particular object of the present invention is to provide an improved type hydraulic press having the desirable characteristics of both mechanical and hydraulic presses.

In the class of work for which presses are employed, there are a variety of work cycles such as forming, blanking, piercing and drawing which work cycles vary in their requirements. For example, blanking and piercing operations are generally carried out at high speed and the exact stroke of the working member of the press is not critical so long as it carries the punch completely through the workpiece being blanked or pierced. On the other hand, forming and drawing operations are usually not carried out at high speeds and the stroke of the plunger is critical because the drawing member or punch generally bottoms against the stationary die or against the workpiece being drawn.

Also, in blanking and piercing operations, the load on the punch is momentary, being in the nature of shock load, and is concentrated at the point of travel of the punch where it is receiving the greatest thrust from its actuating member. With drawing and forming operations, the load is more uniformly distributed and may extend over a large part of the punch travel. From this, it will be seen that a press to be universally useful must be able to operate at high speed, to possess sufficient reserve power to withstand the impacts on the punch during blanking and piercing operations, and be arranged for speed and stroke adjustment of the member carrying the punch, and have the characteristic of developing a high force on the said member during a large part of the travel thereof.

One of the objects of the present invention is to provide a press of this type.

Still another object is to provide a hydraulic press having an operating circuit by means of which the press ram can be reciprocated at extremely high speeds.

Still another object is to provide a hydraulic press having a reciprocable ram and a control circuit therefor by means of which the ram can be cycled at high speed through single or automatic cycles as desired.

It is a still further object to provide a hydraulic press in which the position of the movable platen is readily adjustable for accommodating different die sizes.

A still further object is to provide an operating circuit for a hydraulic press including a pump and motor such that the pump is carried over peak-power loads without losing any substantial amount of speed.

These and other objects and advantages will become more apparent upon reference to the following description taken in connection with the attached drawings in which:

Figure 3 is a plan section indicated by the line 3—3 on Figure 1;

Figure 4 is a vertical section indicated by the line 4—4 on Figure 3 and showing an adjustable cam for actuating one of the control valves;

Figure 5 is a vertical section through the working ram and platen of the press and is indicated by the line 5—5 of Figure 2;

Figure 6 is a section through the surge valve for the ram and is indicated by the line 6—6 on Figure 5;

Figure 7 is a diagrammatic showing of the operating circuit for the press ram;

Figure 8 is a sectional view through the main operating valve of the circuit of Figure 7;

Figure 9 is a diagrammatic showing of the control circuit for the valve of Figure 8;

Figures 10 and 11 are views of the selector valves of the control circuit of Figure 6 in position for manual cycling of the press ram; and Figures 12 through 14 are energy charts showing the effect of the pump motor and flywheel arrangement of this invention.

Structural arrangement

Figure 1:
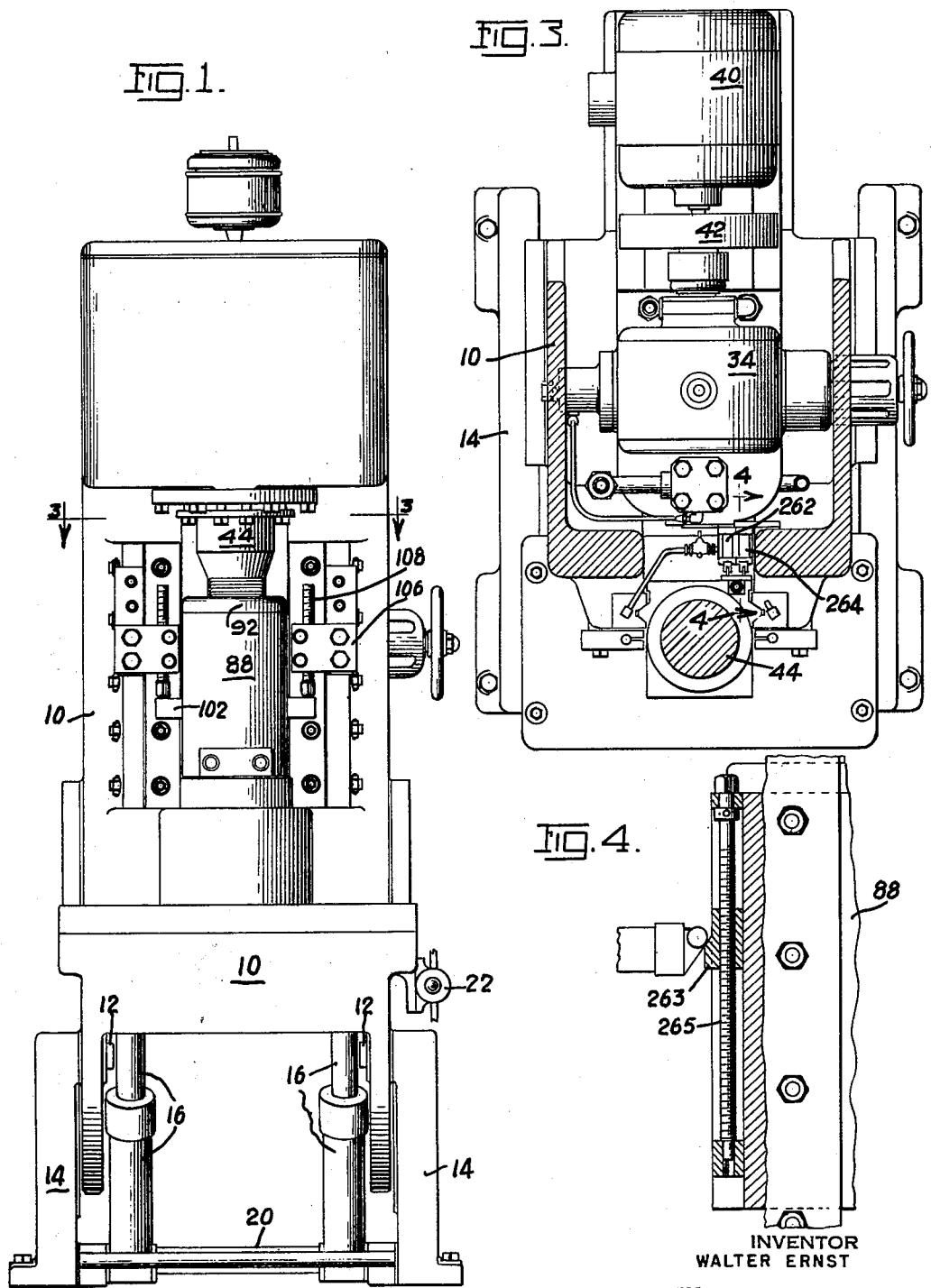
Figure 1 is a front elevation of a press constructed according to this invention.
Figure 2:
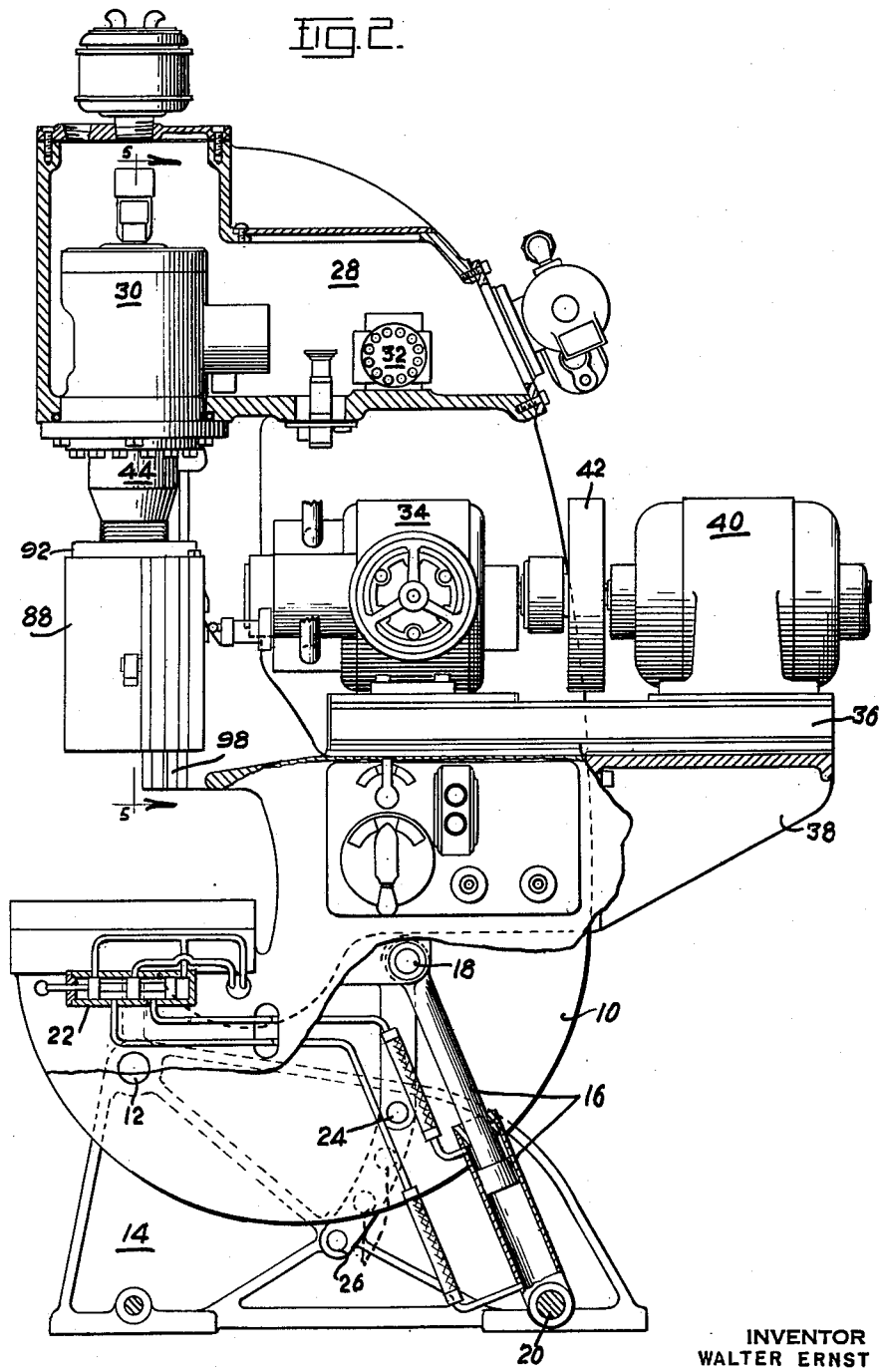
Figure 2 is a side view of a press constructed according to this invention and partly broken away to show the construction thereof.

Referring to the drawings, Figures 1, 2 and 3 illustrate a press having a frame 10 which may be of plate suitably braced by cross-structural members but which, preferably, is cast in one piece. The frame 10 is pivoted as at 12 to a pair of base members 14, and is angularly adjustable in the said members about the pivots 12 by a piston and cylinder arrangement indicated at 16 which is pivoted to the said frame at 18, and to the base members at 20. Actuating fluid is directed to one end or the other of the piston and cylinder arrangement by a distributing valve 22 which is located to be easily available to the press operator. The press frame may be retained in any of several angular positions by the pins 24 which pass through an aperture in the press frame and into one of several apertures 26 in the base members 14.

The upper end of the frame 10 has integrally formed therewith a chamber 28 which serves as an oil reservoir for the operating fluid of the press, and into which extends the press cylinder 30. Also carried within the chamber 28 is the main operating valve 32 which controls the supply of fluid from the pump 34 to the cylinder 30.

The pump 34 is preferably of the adjustable stroke type in order to provide for a variable delivery to control the speed of operation of the press ram, and is carried on a base 36 which is mounted on a bracket 38 carried on the back of the press frame. The pump 34 is driven by a motor 40 and carried on the drive shaft between the pump and motor is a flywheel 42. The motor 40 is preferably of the high slip type so that during the time that the pump 34 is under load, the pump motor and flywheel will slow down and energy will be extracted from the flywheel and, thereafter, when the load is removed from the pump and the pump, flywheel and motor begin to speed up energy will be supplied to the flywheel.

The construction of the press ram and platen is best seen in Figure 5 wherein it will be seen that the press ram 44 extends into the cylinder 30 through the packing 46 and has connected thereto at the upper end the separable head portion 48 as by the bolt 50. The head portion 48 includes the piston rings 60 which prevent leakage of fluid around the said head.

The head or piston 48 is provided with a pair of bores 62 into which extend the booster rams 64 which are rigidly carried in the cylinder head 66. The cylinder head 66 is bolted to the end of the cylinder by a plurality of bolts 68 and the resilient sealing ring 70 prevents leakage of fluid around the cylinder head.

The head 66 also has a central port 72 therein which communicates, as seen in Figure 6, through the openings 74 with the chamber 28. The port 72 includes a valve seat against which seats the poppet type surge valve member 76 which has a spring 78 serving continuously to urge the said valve member against its seat, and a piston 80 which is supplied with pressure fluid through a conduit 82 for moving the surge valve member into its open position.

The ram 44 extends downwardly from cylinder 30 and has a threaded end portion as at 84 thereon which is engaged by a nut 86. The nut 86 is carried in a recess in the upper surface of the press platen 88 and is movable in angular movements as by a spanner wrench adapted for engagement with the recesses 90. The nut 86 is adapted for being locked in any position of adjustment by the clamping ring 92 which is secured to the platen 88 by the screws 94 which can be loosened to permit rotation of the nut 86 and tightened to clamp the nut in place.

The platen 88 has laterally extending portions thereon as at 96 which are receivable in guideways 98 in the press frame, so that the platen is guided to reciprocate in a straight line toward and away from the press bed.

The platen may have the cross passage 100 therein through which extends the knockout bar 102 which, in turn, carries the knockout pins 104 which extend into a punch or die carried by the platen. Carried on the press frame in the brackets 106 are the adjustable screws 108 which, when the platen is fully retracted, engage the knockout bar 102 and therethrough actuate the knockout pins 104 to dislodge workpieces from the punch or die carried on the platen 88.

*Operating circuit*

The operating circuit for the press ram is best seen in Figure 7 and the valves therefor will be seen in section in Figures 5 and 8. In Figure 7, it will be seen that the pump 34 draws fluid from the chamber or reservoir 28 through a conduit 110 and expels the said fluid through a conduit 112 into the inlet of the main operating valve 114. The conduit 112 may also open through a relief valve 116 to the reservoir to relieve excessive pressure from the said conduit if necessary.

The valve 114 is connected by a conduit 118 with the booster rams 64, and by a conduit 120 with the retracting side of the ram 44. The conduit 82 leading to the surge valve in the top of the press cylinder is also connected with the conduit 120.

The conduit 120, adjacent the cylinder 30 includes a resistance valve 122 which is best seen in Figure 5. This valve includes a check valve 124 opening toward the cylinder 30, and a spring loaded valve member 126 which passes fluid away from the said cylinder. It will be noted that the valve member 126 includes a downward acting area which opposes the thrust of the spring 128 and, at a predetermined pressure permits fluid to be expelled from the retracting means of the ram. This prevents the ram and platen from dropping under their own weight when the press sets idle.

The valve 114 is best seen in Figure 8 wherein it will be noted that the valve comprises the casing 130 having a valve bore 132 which is intersected by the inlet port 134 which is connected with the pressure conduit 112, the service ports 136 and 138 which are connected, respectively, with the conduits 120 and 118, and the exhaust ports 140. The exhaust ports are connected, as seen in Figure 7, with the reservoir 28 by means of the conduit 142.

Reciprocable within the valve bore 132 is a valve member having the spaced spool portions 144 thereon. The spool portions are notched as at 146 so that when the valve member is in its center position as shown in Figure 8, there is a restricted passage connecting the inlet port 134 and the service ports 136 and 138 with exhaust. The valve member comprises stem portions extending each way therefrom through axial bores formed in a pair of annular plugs closing the opposite ends of the valve bore 132, and have shoulders thereon as at 148 which engage pistons 150 that reciprocate in the cylinders 152. The pistons are also backed up by the springs 154 which operate to urge the pistons 150 against the plugs, and thereby serve as centering springs for the valve member.

The stems of the valve member also extend into the end cylinders 156 and are abutted therein by the pistons 158 which are actuated by compressed air. The piston on the left end of the valve as seen in Figure 8 receives compressed air from the conduit 160 while the piston on the right end of the valve receives compressed air from the conduit 162.

Each of the cylinders 152 is hydraulically connected with the service port on the opposite end of the valve. These connections are indicated by the conduits at 164 and are operable to prevent the shifting of the valve member beyond its center position to connect either of the service ports with exhaust whenever there is more than a predetermined pressure standing in the said port. This prevents the sudden release of fluid from either side of the press ram while under pressure and thereby prevents shock and vibration of the press at the time of reversal.

For example, when the valve member is shifted rightwardly, as viewed from Fig. 8, by introducing fluid pressure into the left-hand cylinder 156, fluid from conduit 112 passes into conduit 118, while conduit 120 is connected with the left-hand exhaust port 140. This causes the ram 44 to advance until resistance is encountered. At this time, compressed air may be introduced by way of the conduit 162 into the right-hand cylinder 156 to shift the valve member leftwardly. However, as the valve member reaches its centered position, the left-hand shoulder portion 148 engages the piston 150, and if the fluid pressure within the left-hand cylinder 152 is sufficiently greater than the pressure of the compressed air acting on the right-hand piston 158, due to the build-up of pressure within the conduits 118 and 164, the valve member will remain in its centered position until the build-up in pressure is relieved within the left-hand chamber 152, the conduit 164, and the conduit 118 by way of the notches 146 in the right-hand spool member 144. Thereafter, the pressure of the compressed air introduced by way of the conduit 162 will shift the valve member leftwardly to connect the inlet port 134 with the left-hand service port 136, while fully connecting the conduit 118 with exhaust. Thus, the pressures within the respective pressure areas of the ram are relieved gradually upon shifting of compressed air pressure upon the opposite pistons 158.

Control circuit

Figure 9 illustrates the control circuit for controlling the actuation of the reversing valve 114. In Figure 9, there is a source of fluid such as compressed air indicated at 200. The supply of compressed air from the source 200 to the valve is controlled by the positions occupied by the shift valves indicated at 202, 204 and 206. The valve 202 comprises a pair of piston portions 208 and 210 which are movable alternately into open and closed position by a lever 212 which is actuated by the double acting plunger 214. The smaller area of the plunger 214 is continuously supplied with pressure fluid by a conduit 216 leading to the source 200, while pressure is supplied to the other side of the piston through various selector valves to be described hereinafter.

The valve 204 has the valve members 218, 220, and the valve 206 has the valve members 222 and 224, the said valve members being alternately movable into open and closed position by the levers 226 and 228 which are connected for simultaneous actuation by the double acting piston 230. The upper, smaller area of the piston 230 is continuously supplied with pressure from the source 200 by a conduit 232 while the lower, larger surface thereof is selectively supplied with pressure fluid by the aforementioned control valves.

The valves 202, 204 and 206 are connected to the valve 114 through a pair of selector valves 234 and 236 which select between automatic and manual operation according to their position. The valve 234 includes a movable portion indicated at 238 which is movable from the position shown in Figure 9 into position shown in Figures 10 and 11. In the position shown in Figure 9, the valve 234 connects the conduit 160 with the conduit 240 which leads to one side of the valve member 220. The valve 234 also connects the conduit 162 with the conduit 242 which leads to one side of the valve member 208. The valve 234 also connects the conduits 244 and 246 which lead to the valve 236 and within which the said conduits are interconnected.

The conduit 242 which leads to one side of the valve member 208 is also connected to one side of the valve member 210 the other side of which is connected to a conduit 248 with one side of the valve member 222. There is also a connection from the same side of the valve member 222 to one side of the valve member 224, the other side of which is connected directly with the exhaust. The opposite side of the valve member 222 is connected with the pressure source 200 by a conduit 250 so that with the valve in the position shown pressure is supplied to the conduit 248 while if the valve is shifted the conduit 248 is connected with the exhaust.

Returning to the valve 202, the side of the valve member opposite the conduit 242 is connected with the exhaust as at 252 so that in the position shown the valve member 202 connects the conduits 242 with exhaust while if shifted will connect the conduit 242 with the conduit 248.

The valve member 204 in the position shown connects the conduit 240 through the conduit 254 with exhaust at 256 and, when shifted connects the said conduit 240 with the pressure source by the conduit 258.

For supplying pressure to the pistons 214 and 230 there are provided the pilot valves at 260, 262, 264 and 266. Each of the aforementioned valves is normally closed and is adapted for being opened at a predetermined time, or in response to a predetermined stimulus for either supplying compressed air to, or exhausting air from one or both of the pistons 214, 230.

The valve 266 is adapted for actuation by a foot lever 267 and, when opened, connects the pressure conduit 268 with a conduit 270 leading to the valve 262. The valve 262 is adapted for being opened by the lever 272 when the press platen is in its fully retracted position so that the pressure fluid from the conduit 270 also passes to the conduit 274 and from there is conducted to the lower sides of the pistons 230 and 214. With the pistons in the positions shown, the piston 230 is actuated upwardly to open the valve member 220 and 224 and to close the valve members 218 and 222 while the piston 214 remains in its upper position to hold the valve 208 open and to close the valve member 210.

With the valves so shifted the conduit 162 is exhausted through the valve 234, the conduit 242 and the exhaust connection 252 while the conduit 160 is supplied with pressure through the conduit 240 and the conduit 258.

This shifts the valve 114 to place the press on forward stroke and to bring the ram downwardly. When the ram has built up a predetermined pressure, the plunger 276 is actuated thereby and moves the valve 260 into position to exhaust the lower area of the piston 214 through the conduit 278 and 280, and the lower area of the piston 230 through the conduit 274, check valve 282, and conduit 280.

This permits both of the pistons 214, 230 to move downwardly thereby to close the valve members 208, 220 and 224 and to open the valve members 210, 218 and 222. This brings about the exhausting of the conduit 160 through the conduit 240, the conduit 254 and the exhaust connection 256 and supplies pressure fluid through the conduit 162 to the conduits 242, 248 and 250. The press then goes on reverse stroke as soon as the valve 114 shifts and the press ram commences its retraction stroke. As the press ram approaches the upper limit of its travel, it actuates the valve 264 into open position by the lever 284 and thus permits pressure fluid from the conduit 286 to pass through the conduit 278 to the piston 214 to move it into the position shown in Figure 9.

As best seen in Figure 4, the valves 262 and 264 are adapted for actuation by the cam means 263 adjustably carried on the threaded spindle 265 of the platen 88.

As mentioned before the opening of the valve 264 exhausts both of the conduits 160 and 162 and permits the centering springs of the valve member 114 to move the valve member thereof to its center position thereby to bring the press ram to a halt.

Manual operation of the press may be had by opening the valve 288 which bypasses the valve 262. With the valve 288 opened, the downward movement of the press is controlled by holding the foot lever 267 depressed, and as soon as the lever 268 is released the press platen will return to its upper position. Full automatic cycling may be had by closing the valve 288 and opening the valve 290 which bypasses the foot operated valve 266.

For hand operation of the press ram throughout the cycle, the valve 234 is shifted into its Figure 10 position wherein it connects the conduit 160 with the conduit 244, the conduit 162 with the conduit 246 and connects the conduits 240 and 242 together. Thereafter, a forward stroke of the press ram may be had by shifting the valve 236 to connect the conduit 244 with the pressure conduit 232 and the conduit 246 with the exhaust connection at 292. This supplies pressure to the conduit 160 and exhausts the conduit 162.

A reverse stroke of the press may be had by shifting the valve 236 to connect the conduit 244 to the exhaust connection 292 while connecting the conduit 246 with the pressure conduit 232. It will be apparent that full manual operation obtains with the valve 234 in its Figures 10 and 11 position.

Motor pump and flywheel combination

The combination of the motor 40, flywheel 42 and pump 34 operates on an energy transfer cycle which is diagrammatically illustrated in Figures 12 through 14. In Figure 12, there is charted the energy which is received by the pump. This is divided into a portion indicated at 300 which is a continuous power consumption due to friction, windage and other fixed rotational losses in the pump. Periodically, and it is assumed that the press ram is cycling automatically at a predetermined rate, there are power requirements represented by the peaks at 302.

In Figure 13, there is illustrated the energy cycle of the flywheel 42. In comparing Figures 12 and 13, it will be noted that the pump operates between upper and lower limits of power consumption and that, accordingly, by using a high slip motor the pump will decelerate when it is at the peak power requirement and accelerate when the power requirements thereof are at a minimum. Accordingly, in Figure 13, the energy cycle of the flywheel is shown as oscillating above and below a median line 304 with the areas below the line, indicated at 306 representing energy received by the flywheel from the motor during the periods of acceleration of the pump and motor. The areas above the line 304, indicated at 308, occur during the periods of deceleration of the pump and motor and represent energy given up by the flywheel and transmitted to the pump.

Referring now to Figure 14, in conjunction with Figures 12 and 13, it will be found that the sum of the power requirements of the pump and flywheel is a substantially flat line indicated at 310 and being made up of the area 300 from Figure 12, the area 306 from Figure 13, and the areas 312 from Figure 12 which represent the difference between the peak pump requirements and the energy transferred to the pump from the flywheel.

It will be noted that the power requirements of the driving motor are substantially less due to the influence of the flywheel than would be necessary if the pump were connected directly with the motor. Thus, a substantial saving in initial cost and operating expense is obtained by the use of the motor and flywheel combination of the present invention.

It will be understood that this invention is susceptible to modification in order to adopt it to different usages and conditions and, accordingly, it is desired to comprehend such modifications within this invention as may fall within the scope of the appended claims.

I claim:
1. In a reversing valve for hydraulic rams; an elongated valve casing formed with an axial valve bore, a pressure inlet, a pair of service ports and exhaust ports, all of said ports intersecting the valve bore at relatively spaced intervals therealong; a spool-type valve member movable longitudinally within the valve bore and having a pair of relatively spaced spool portions arranged for wiping engagement with the walls of the casing defining the valve bore, and formed at their peripheral edges with a plurality of recessed grooves, said valve member being movable within the valve bore to a first centered position establishing restricted communication between the inlet port and the service and exhaust ports, and opposite end positions providing alternate communication between the inlet port and each of the service ports while connecting the opposite service port with exhaust, said valve member being provided at either end with longitudinally extended stem portions projecting outwardly from either end of the valve chamber and having shoulders thereon; cylinder means carried at either end of said valve casing and enclosing the stem portions of said valve member; a first piston means in said cylinder means engageable with the shoulders of said valve member and normally urging said valve member to its centered position, said piston means being in fluid communication with the service ports of said valve casing and being operable, in response to predetermined high pressures at said service ports, to prevent movement of said valve member from an end position past its centered position and toward its opposite end position until said predetermined high pressures are relieved; and pneumatically operated means in said cylinder means engageable with the stem portions of said valve member for shifting the latter between its end positions.

2. In a reversing valve for hydraulic rams; a valve casing formed with a valve bore, a pressure inlet port, exhaust ports spaced from the pressure inlet port, and a pair of service ports intersecting the valve bore between the inlet and exhaust ports; a valve member movable within the valve bore and formed with a pair of relatively spaced spool parts having notched edge portions disposed in wiping engagement with the walls of said casing defining the valve bore, said valve member being movable within the valve bore to a first centered position establishing restricted communication, by way of the notched edge portions of said spool portions, between the inlet port and the service and exhaust ports, and opposite end positions establishing communication between either one of the service ports and the inlet port while connecting the opposite service port with exhaust, said valve member being provided with relatively reduced diameter stem extensions projecting outwardly through the ends of the valve bore and formed with opposed shoulders; cylinder means enclosing the stem portions of said valve member; fluid-actuated stop means in said cylinder means engageable with the shoulders of the stem portions of said valve member and responsive to a given fluid pressure at the service ports of said valve casing for arresting movement of said valve member from one end position to another in its centered position until said given pressure is relieved; spring means engaging said stop means for urging said valve member to its centered position; and fluid-pressure-responsive means in said casing for moving said valve member between its end positions.

3. In a reversing valve for reciprocating hydraulic rams; a valve casing formed with a valve chamber, an inlet port, a pair of service ports, and exhaust ports, all of said ports intersecting said valve chamber at different levels therein; a valve member movable in the valve chamber and formed with relatively spaced shoulders, and having spaced spool portions thereon in wiping engagement with the walls of said casing defining the valve chamber, the spool portions of said valve member being formed with a plurality of grooves in the peripheral surfaces thereof, said valve member being movable in the valve chamber to a first centered position providing restricted communication by way of the grooves in the spool portions of the valve member between the inlet, service, and exhaust ports, and opposite end positions establishing communication between the inlet port and either of the service ports while connecting the other service port with exhaust; spring means in said casing arranged to urge said valve member to its first centered position; fluid-pressure-responsive means in said casing engageable with said valve member at opposite ends thereof for shifting said valve member between its opposite end positions; and a pair of opposed fluid-pressure-responsive plungers slidable in said valve casing and communicating, respectively, with opposite service ports of said casing and engageable with the shoulders of said valve member when the latter moves from its centered position toward either of its opposite end positions, said plungers being responsive to a predetermined high pressure in the service ports of said valve casing to delay movement of said valve member from one end position past its centered position to its opposite end position until said predetermined high pressure in the service ports is relieved by way of grooves in the spool portions of said valve member.

4. In a reversing valve for hydraulic rams; a valve casing formed with a valve bore, an inlet port, first and second service ports, and an exhaust port, said ports intersecting the valve bore at relatively spaced intervals therealong; a valve member formed with spaced shoulders thereon and including relatively spaced spool portions movable within the valve bore of said casing, the spool portions of said valve member being disposed in wiping engagement with the walls of said casing defining the valve bore and being formed at their peripheral edges with a plurality of grooves, said valve member being movable in said casing to a centered position providing for restricted communication between the inlet, service, and exhaust ports of said casing, a first end position connecting the inlet port with the first service port and the second service port with exhaust, and a second end position connecting the inlet port with the second service port and the first service port with exhaust; means for shifting said valve member between said first and second end positions; a pair of opposed fluid-pressure-responsive plungers slidable in said casing and engageable with the shoulders of said valve member when the latter moves from its centered position toward either of its first or second end positions; and means hydraulically connecting said plungers, respectively, with the first and second service ports of said casing, said plungers being responsive to a predetermined high pressure within the service ports of said casing to arrest shifting movement of said valve member from one end position to its opposite end position in its centered position until said predetermined high pressure is relieved.

WALTER ERNST.

REFERENCES CITED

The following references are of record in the file of this patent:

UNITED STATES PATENTS

| Number | Name | Date |
|---|---|---|
| 1,943,061 | Douglas | Jan. 9, 1934 |
| 2,113,161 | Osborne | Apr. 5, 1938 |
| 2,213,450 | Munschauer | Sept. 3, 1940 |
| 2,246,379 | Muir et al. | June 17, 1941 |
| 2,250,389 | Miller | July 22, 1941 |
| 2,296,051 | Pocock | Sept. 15, 1942 |
| 2,316,944 | Ernst | Apr. 20, 1943 |
| 2,324,697 | Harrington | July 20, 1943 |
| 2,350,983 | Boyles | June 13, 1944 |
| 2,351,317 | Camerota | June 13, 1944 |
| 2,358,650 | Maude | Sept. 19, 1944 |
| 2,365,075 | Hassman | Dec. 12, 1944 |
| 2,367,241 | Stacy | Jan. 16, 1945 |
| 2,368,138 | Hayden | Jan. 30, 1945 |
| 2,369,505 | Ward | Feb. 13, 1945 |
| 2,380,705 | Proctor | July 31, 1945 |
| 2,390,849 | Shoup | Dec. 11, 1945 |
| 2,411,716 | Ernst | Nov. 26, 1946 |
| 2,429,669 | Crawford | Oct. 28, 1947 |
| 2,433,156 | Pezzillo | Dec. 23, 1947 |
| 2,449,889 | Eisen | Sept. 21, 1948 |

FOREIGN PATENTS

| Number | Country | Date |
|---|---|---|
| 378,453 | Italy | Feb. 10, 1940 |